United States Patent
Pirs et al.

(10) Patent No.: US 7,420,631 B2
(45) Date of Patent: Sep. 2, 2008

(54) HIGH CONTRAST, WIDE VIEWING ANGLE LCD LIGHT-SWITCHING ELEMENT

(75) Inventors: Janez Pirs, Ljubljana (SI); Matej Bazec, Koper (SI); Silvija Pirs, Ljubljana (SI); Bojan Marin, Ljubljana (SI); Andrej Vrecko, Ponikva (SI)

(73) Assignee: Institut Jozef Stefan (SI)

( * ) Notice: Subject to any disclaimer, the term of this patent is extended or adjusted under 35 U.S.C. 154(b) by 15 days.

(21) Appl. No.: 10/556,763

(22) PCT Filed: Apr. 14, 2004

(86) PCT No.: PCT/EP2004/003939

§ 371 (c)(1), (2), (4) Date: Dec. 21, 2006

(87) PCT Pub. No.: WO2004/102265

PCT Pub. Date: Nov. 25, 2004

(65) Prior Publication Data

US 2007/0273811 A1    Nov. 29, 2007

(30) Foreign Application Priority Data

May 16, 2003    (SI)    ................ P-200300124

(51) Int. Cl.
G02F 1/1335    (2006.01)
(52) U.S. Cl. .......................... 349/96; 349/101
(58) Field of Classification Search .................. 349/96, 349/101
See application file for complete search history.

(56) References Cited

U.S. PATENT DOCUMENTS

| | | | | |
|---|---|---|---|---|
| 4,001,028 A | * | 1/1977 | Frost et al. ................ | 501/80 |
| 4,609,255 A | * | 9/1986 | Leenhouts et al. .......... | 349/103 |
| 4,634,229 A | * | 1/1987 | Amstutz et al. ............. | 349/101 |
| 4,889,412 A | * | 12/1989 | Clerc et al. ................. | 349/118 |
| 4,952,030 A | * | 8/1990 | Nakagawa et al. .......... | 349/103 |
| 5,004,324 A | * | 4/1991 | Leenhouts et al. .......... | 349/181 |
| 5,155,608 A | * | 10/1992 | Hatano ....................... | 349/76 |
| 5,187,603 A | * | 2/1993 | Bos ............................ | 349/117 |
| 5,196,953 A | * | 3/1993 | Yeh et al. .................... | 349/119 |
| 5,245,456 A | * | 9/1993 | Yoshimi et al. ............. | 349/118 |
| 5,298,199 A | * | 3/1994 | Hirose et al. ................ | 264/2.6 |
| 5,344,916 A | * | 9/1994 | Harris et al. ................ | 528/353 |
| 5,377,032 A | * | 12/1994 | Fergason et al. ............. | 349/14 |
| 5,382,648 A | * | 1/1995 | Picken et al. ................ | 528/75 |
| 5,480,964 A | * | 1/1996 | Harris et al. ................ | 528/353 |
| 5,515,186 A | * | 5/1996 | Fergason et al. ............ | 349/14 |
| 5,525,265 A | * | 6/1996 | de Wit et al. ............... | 252/587 |
| 5,559,265 A | * | 9/1996 | Love et al. .................. | 558/177 |
| 5,559,618 A | * | 9/1996 | Mori .......................... | 349/117 |

(Continued)

Primary Examiner—M. R. Connelly-Cushwa
Assistant Examiner—Rhonda S Peace
(74) Attorney, Agent, or Firm—Renner Kenner Greive Bobak Taylor & Weber

(57) ABSTRACT

A new concept of the normally open LCD light switching element is proposed, which allows for the superior angular compensation for the light attenuation by using a single simple negative bireffingent c-plate compensation layer. The concept is based on the simultaneous use of highly angularly symmetric STN LC-configuration (preferably 180° twist) and maximal use of the single (preferably ordinary ray) light propagation mode. The solution is best suitable for various light switching applications like LCD automatic protective welding light filters, as well as for multi-segment large display panels, where it provides for excellent uniformity of the light-attenuation in the "dark" state.

8 Claims, 6 Drawing Sheets

U.S. PATENT DOCUMENTS 5,580,950 A * 12/1996 Harris et al. ................ 528/350
5,646,703 A * 7/1997 Kamada et al. ............. 349/118
7,061,462 B1 * 6/2006 Pirš et al. ...................... 345/96
7,132,133 B1 * 11/2006 Pirš et al. .................... 427/492

* cited by examiner

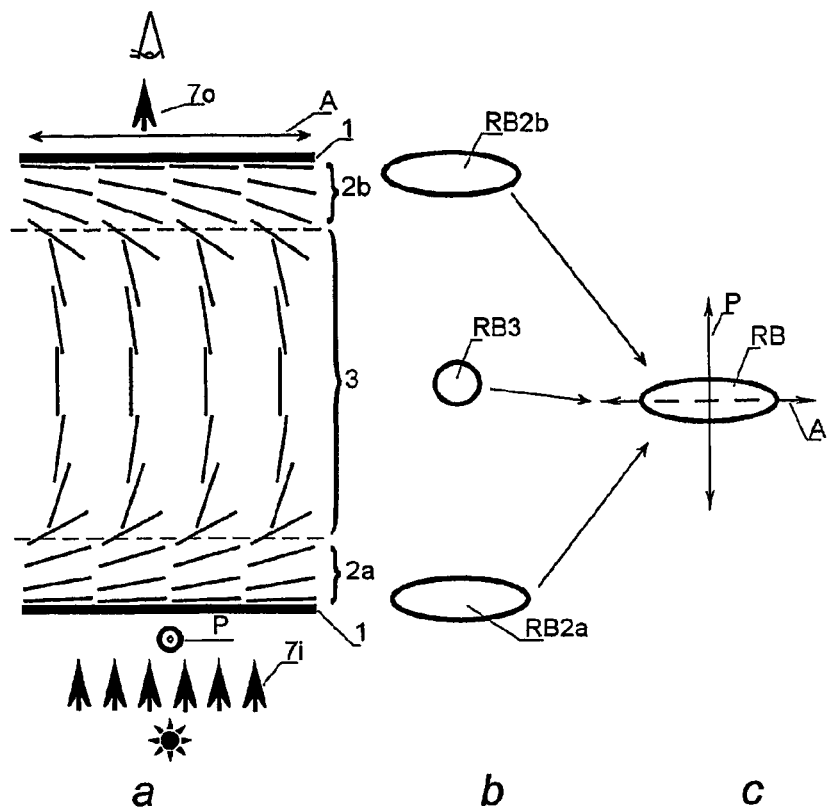
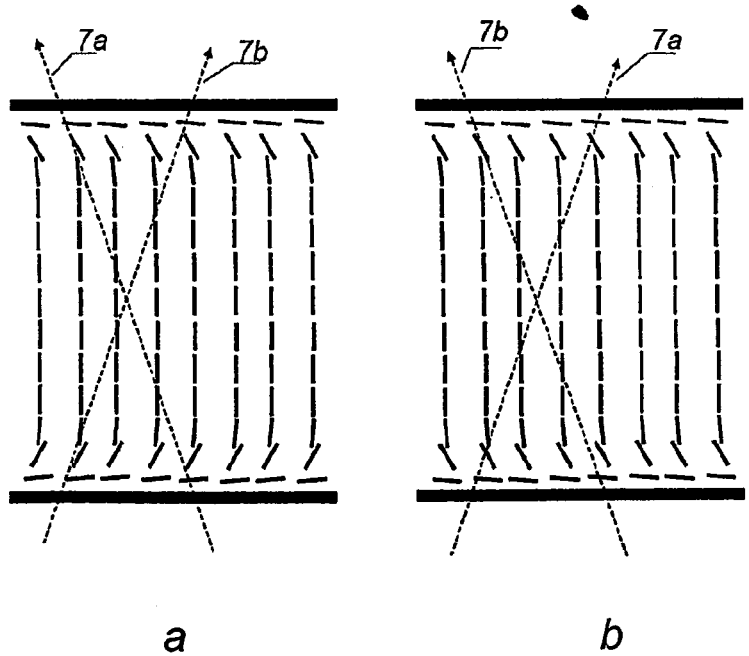
Fig. 2
Fig. 3

HIGH CONTRAST, WIDE VIEWING ANGLE LCD LIGHT-SWITCHING ELEMENT

OBJECTIVES OF THE INVENTION

The objective of the present invention is a concept of the LCD light-switching optical element allowing for high, electrically controlled light attenuation optimized for the light incidence along the normal to the LCD plane. At the same time the new LCD light-switching optical element has to exhibit very low light attenuation dependence for the oblique incidence of light within a limited cone of angles off the normal incidence direction (~15°—see international safety and quality regulation EN 379 for personal protection optical devices). Light-switching elements like these have a wide potential for applications in human eye protective, stereovision and specialized optical devices, as well as in any other application requiring that a light blocking be effective even, when light travels through the light-switching element at an oblique angle (for example: large medium information content display panels).

TECHNICAL FIELD OF THE INVENTION

The technical field of the present invention is the field of light-switching optical elements allowing for high, electrically controlled light attenuation optimized for the light incidence along the normal to element plane. Such light-switching optical elements are used in particular for applications in human eye protective, e.g. in welding filters, in stereovision and specialized optical devices, as well as in any other application requiring that a light blocking be effective even, when light travels through the light-switching element at an oblique angle.

This situation is significantly different from the angular dependence issue in the technical field of LCD screens for laptop computers, monitors and TV, where rather moderate light contrasts are required and the symmetry of the light attenuation around the normal to the LCD plane is not so important (best viewing angle), while the limit of the viewing angle is typically determined as the angle of the gray scale inversion.

The object of the present invention is to provide a light-switching optical element allowing for high, electrically controlled light attenuation (several hundreds to several ten thousands) and having a symmetrizised light attenuation around the normal to the element plane as well as an enlarged viewing angle. According to the invention the problem is solved by specific, novel modification of the general principle of twisted nematic LCD, allowing for "symmetrizing" the overall birefringent properties, which in term results in their angular compensation.

BACKGROUND OF THE INVENTION

The fundamentals of the above mentioned problems are well understood, because the origin of these problems is very similar to the well-known "viewing angle" problem found in liquid crystal displays (LCDs) in general. Because of the very large impact of the viewing angle problem, found in liquid crystal displays (LCDs) of laptop computers and TV, worldwide interest in this problem has led to a number of solutions.

The origin of the "viewing angle" problem, as presented in the FIGS. 1 and 2 can be in general regarded as threefold: a 1. Effective birefringence of the homeotropically aligned LC molecules in the central part 3 of the LC layer 4 of the LCD in the closed state of the LCD light-switching element, when observed at an oblique angle,
2. Effective overall birefringence of thin transition surface layers 2a and 2b of the LC molecules 4 at both boundary surfaces $1c^a$, $1c^b$ of the LCD, which are relatively little affected by the driving electric field, but rather controlled by the alignment surface interactions,
3. Effective birefringence asymmetry resulting from the asymmetry of the LC molecular alignment in the transition surface regions 2a and 2b—strongly depends on the twist angle used in the particular structure of the LCD.

Finally the LCDs typically employ crossed polarizers to detect the changes in the birefringent properties of the LC layer under the effect of the driving electric field. As has been well know for decades (L. Baxter: J. Opt. Soc. Am., 46, p. 435) the polarizers themselves exhibit noticeable angular dependence, as the effective angle between the crossed polarizers is dependent on the light incidence angle. The problem of changing the effective angle between the crossed (90°) polarizers with the viewing angle has been rather recently very efficiently solved by P. Bos at al (Jpn. J. Appl. Phys. Vol. 38 (1999), SID Dig. (1998) p. 315), by using two additional, adequately positioned birefringent layers—positive-birefringent a-plate and positive-birefringent c-plate retardation layer, placed between the crossed polarizers. The problem however is that from a technical point of view lamination of two rather special additional retardation layers into the LCD assembly is rather expensive and time consuming.

Aside from the above problem of the crossed polarizers, as described above, the general problem of the angular dependence of LCDs has been given a tremendous attention by the LC research, as well as by the LCD industrial producers' community and large number of different technical solutions has been developed using different twist nematic (TN) LCD concepts (standard TN (twist angle=90°), low TN (twist angle≈70°), super TN (twist angle—significantly higher than 90°—typically 240°, . . . ). In general each of the wide viewing angle technical solutions is based on the additional use of some kind of the birefringent compensation layer incorporated between the LCD cell and the polarizers. "Negative birefringence films" necessary to compensate for the "positive" birefringence of standard nematic LC, were sought after unsuccessfully for a number of years, with one of the first successful results shown by Uchida (SID 89 DIGEST, p 378-381) from Tohoku University in 1989 and Clerc (U.S. Pat. No. 4,001,028, U.S. Pat. No. 4,889,412, U.S. Pat. No. 5,298,199) from Stanley in 1991. results were based on the shear induced negative birefringence in a thermoplastic material cycled through the glass transition. Few years later Eblen from Rockwell showed that a multilayer thin film can have negative birefringence properties (U.S. Pat. No. 5,196,953) and very recently Pirs et al (WO 00/77561 A2) obtained similar negative birefringent properties by a mechanical stress induced in a thin layer of polymer by a fast, controlled polymerization process. Yet another process was demonstrated by Harris and Cheng in 1994 and later by Shin-Tson-Wu from Hughes (U.S. Pat. No. 5,344,916, U.S. Pat. No. 5,580,950, U.S. Pat. No. 5,480,964). They showed by spinning down a thin layer of a particular class of pre-imidized polyimides, that the long molecular segments would align preferentially in the plane of the film and therefore a higher value of the index of refraction results for light propagating along the cell normal than at an angle to it. Their material was one of the first films that were rather convenient to produce. Finally one has to mention a number of excellent technical solutions developed for high information content LCD panels (computer terminals, TV, . . . ) like compensating films for STN LCDs, as developed by NITO Denko (U.S. Pat. No. 5,245,456, SID Digest 92, p 739 and SID Digest 91, p 739) and polymer discotic LC compensating layers developed by Fuji Film (U.S. Pat. No. 5,559,618, U.S. Pat. No. 5,646,703, U.S. Pat. No. 5,525,265) as well as twisted nematic polymer retardation layer developed by Akzo Nobel (U.S. Pat. No. 5,382,648, U.S. Pat. No. 5,525,265).

A point to be emphasized here is, that due to the voltage limitations, that exist for picture elements in the multiplex addressed LCD screens of lap-top computers and TV, as well as the overall user requirements for these display panels, the evolution of films to improve the viewing angle in this case may not lead to the desired performance and cost target for a shutter device, that has to be used for example in the personal protection devices.

In any case the residual overall positive birefringence of the LC molecules in the optically closed state of the LCD light-switching elements represents the major origin of the inadequate off-normal axis performance and the major correction can be achieved through the introduction of the negative birefringent films. However, there are noticeably different overall requirements for these "negative birefringent compensatory films" in the case of "laptops" and "light shutters". In the case of a shutter device for personal eye protection applications (e.g.: welding glasses, . . . ), the drive voltage can be two to four times that of a LCD for a lap-top computer, and it is much more critical, that very high light attenuations are reached and the off-normal axis light extinction properties of the device are excellent. The relatively high driving voltage typically used with LCD light-switching elements, like shutter devices for personal eye protection applications, result in very good homeotropic alignment of the great deal of the LC layer in the LCD light-switching element. Therefore complex, expensive compensation layers, as mentioned above to be developed by Fuji-film for high information content LCDs in computer terminals, are not necessary and simple, cheap negative c-plate retardation compensation layers seem to be completely adequate.

Besides the angular dependence, resulting from the homeotropically aligned central LC layer 3 in the optically closed state of the LCD light switching optical element, one has to consider also the angular dependence, resulting from the residual overall birefringence of the LC molecules in the transition surface LC layers 2a and 2b, as well as the optical asymmetry of these layers. The former results in the shift of the maximum attenuation direction off the normal light incidence axis—not acceptable for the light switching elements used in personal protection applications as well in stereovision. Finally the asymmetry of the optical birefringence of the LC molecular structure in the transition surface LC layers 2a and 2b result in poor angular dependence symmetry of the light attenuation around the axis normal to the LCD plane. So just the use of the negative birefringent compensation layer by itself is not sufficient to result in the state-of-the-art performances. In view of the above-mentioned LC structure symmetry issues the choice of the optimal technology for optical shutters for LCD light-switching elements is also very important, as the inherent birefringence and viewing angle changes with the LCD technology chosen. The fact is that the negative birefringent compensation layer takes care only of the effective birefringence of the central, homeotropically aligned part of the LC layer 3, while the effective birefringence of thin layers at the display boundaries 2a and 2b remain uncompensated (see FIGS. 1 and 2). Several technical solutions have been developed in order to compensate for this residual birefringence, however typically with the high definition, LCD panels (computer, TV, . . . ) in mind. They are based either on two and four-domain TN technology (IDRC 91, p 68, JJAP 34, p 2396 and number of different patents related to this technology), or on discotic LC polymer compensating film developed by Fuji Film (U.S. Pat. No. 5,559,618, U.S. Pat. No. 5,646,703, U.S. Pat. No. 5,525,265), already mentioned above, which allows for the use of the standard TN technology. The "2- and 4- domain TN solution" is not applicable for the LCD light-switching elements due to poor overall optical properties resulting from the alignment defects at the domain walls (high light scattering!) and therefore does not comply with international quality an safety regulations for personal optical protective devices like EN 379. The "Fuji solution" (U.S. Pat. No. 5,559,618, U.S. Pat. No. 5,646,703, U.S. Pat. No. 5,525,265), already mentioned above, though providing an elegant solution for the computer terminals, also does not seem to be very appropriate for the LCD light-switching elements. The reasons are threefold:

Inferior overall optical properties resulting from the light scattering in the discotic LC polymer compensation film (somewhat more than tolerated by the EN 379 international regulation), Rather high price and very limited choice of the commercially available retardation values, The residual birefringence in the boundary layers of LC changes with the driving voltage, as the effective thickness of these transitional regions 2a and 2b is voltage dependent, while the birefringent properties of the commercially available discotic films are fixed, being optimized only for the computer and TV display market.

The optimum solution for the LCD technology used for LCD light-switching elements seems to be the one, in which the LC molecular alignment is as symmetric as possible and has self-compensating properties for oblique angle of light incidence. If these conditions are met, then the incorporation of a simple negative c-plate retardation layer between the LC cell and the crossed polarizers can result in wide viewing angle and high light attenuation. The introduction of "Pi-cell" by P. Bos from Tektronix (U.S. Pat. No. 5,187,603) represents an excellent example of such self-compensating LC alignment concept, which is schematically presented in the FIG. 3. FIG. 3a shows the molecular alignment of the homogeneously aligned LCD cell driven with the electric field with the amplitude noticeably higher than the switching threshold value ($V \sim 3V_{th}$). Comparing the effective birefringence for the light incoming at an oblique angle from the same direction as the LC molecular tilt on the alignment surface (incident light direction 7b) and from the opposite direction (incident light direction 7a), it becomes very evident that the light attenuation of such a LCD cell must be angular dependent, even if the central homeotropically aligned LC layer is compensated with a negative birefringent c-plate. On the other hand the same comparison made for the "Pi-cell" configuration, schematically shown in the FIG. 3b, clearly shows that the angular dependence of the front and back boundary LC layers mutually compensate each other. This basic principle has been in the past years upgraded by a number of additional technical improvements for various applications by Fergason (U.S. Pat. No. 5,515,186, U.S. Pat. No. 5,377,032) from OSD Envision and Welzen (EP 0638834) from Sagem, as well as in a number of different publications in Display Research scientific magazines (for example: P. Bos, et al: IDW '98, pp. 243-246 (1998) and JJAP 38, p 2837-2844 (1999), K. Vermeirsch et al SID 98 Digest, p 989, . . . ). The concept of the "Pi-cell", angularly compensated with negative birefringent c-plate, probably represents the best-known technical solution for the wide viewing angle and high contrast LCD light-switching elements. It does however have some drawbacks:

Since the "Pi-cell" is operating on the principle of the electrically controlled birefringence (ECB), the production technical requirements are noticeably higher (cell homogeneity, cell thickness control, alignment requirements . . . ) than with standard TN LCDs—higher production costs, In order to suppress 180° molecular twist formation, the "Pi-cell" has to be constantly electrically driven even in the "open" optical state and adjustments of the driving amplitude to obtain optimum transmission in the "open" optical state are necessary, As the front and back boundary LC regions 2a, 2b of the LC layer (see FIG. 1) are aligned in the same direction, a reasonably large residual retardation is created. In order to achieve high light attenuation, extremely high driving voltages (40 V) are necessary unless an additional retardation layer is added, which compensates for the residual retardation. The need for the additional positive birefringent a-plate compensation layer, which is furthermore commercially not available, further complicates the construction and increases the production costs.

Discussing various LCD technologies, adequate for the manufacturing the wide viewing angle and high contrast LCD light-switching elements, one has to mention also the Low Twist Nematic (LTN) LCD technology as described in the patents of Welsen (FR2728358) from Sagem, Nakagawa et al (U.S. Pat. No. 4,952,030) from Asahi Glass Co, Leenhouts et al (U.S. Pat. No. 4,609,255) from Philips, A. Hoernel et al (WO 97/15254, WO97/15255, PCT/SE95/00455) from Hoernel Intl. and published in a number of papers in the Display Research and Scientific magazines (S. Palmer, Appl. Optics, 36, No 10, p 2094, Hirakata et al SID 95 Digest p. 563, . . . ). Though this technology is used for mass-production of the welding light filters, one has to comment that the LTN technology in fact improves the viewing angle, since it allows for making thinner LCD cells and hence smaller effective positive-birefringence to be compensated, however as LCD cell construction is very asymmetrical due to low twist angles and the final results cannot be even close as good as with the "Pi-cell" solutions as described above.

Finally, evaluating various LCD technologies, one has to refer also to the supertwisted LCDs though they have never been used for light shutter applications so far (U.S. Pat. No. 4,634,229, U.S. Pat. No. 5,004,324, U.S. Pat. No. 5,155,608, J. Appl. Phys. 58, 3022, (1985), Appl. Phys. Lett. 50, 1468, (1987), . . . ). Being developed only with high multiplex driven, high resolution LCD display panels in mind (LCD laptop computers, TV, mobile phone displays . . . ) these displays are optimized for maximum steepness of the voltage response curve and so the LCD cell parameters (LC elastic constants, polarizer orientation, . . . ) cannot be the same as with the LCD light shutters, which operate with much higher driving voltages and require gradual voltage response characteristics in order to allow for voltage controlled light attenuation. Furthermore the laptop computer terminals require maximum brightness and tolerate an optimum viewing axis to be tilted to the display panel normal, while the LCD light shutters, which are typical on axis devices (glasses, helmets, optical elements, . . . ) do not. Finally STN LCDs are strictly based on the electrically controlled birefringence effect and are therefore typically two "eigen-mode" light-propagating devices, while it is advantageous for the LCD light shutters to use only single, preferably ordinary mode of light propagation (isotropic) as much as possible (for example TN LCDs) even at the expense of lower light efficiency in the open state in order to reduce the angular dependence of the light attenuation.

SUMMARY OF THE INVENTION

The object of the invention is achieved with the light switching element according to claim 1. The goal and key concept of the proposed invention, is joining the use of the single, preferably, ordinary mode*** of the light propagation (-isotropic) as much as possible and the symmetric highly twisted LC structure. Such a combination finally results in a configuration that can be very efficiently compensated by one simple negative-birefringent layer in a way that can even compensate for the angular dependence of the crossed polarizers. None of the present state-of-the-art technologies has been able to achieve this in a full extent.

*** PLEASE NOTE that for the sake of simplicity only ordinary light ray propagation mode will be considered in the rest of the patent text. It is however understood that choosing the extraordinary light propagation mode by adequate rotation of the crossed polarizers and adequate LCD light shutter construction provides very similar results!

In the proposed technical solution, as in part explained with respect to FIGS. 1 and 2, the highly twisted standard STN LC configuration (U.S. Pat. No. 4,634,229), having the LC molecular director twist angle of 180° (Pi) within the LCD cell ($\Rightarrow$ maximum director configuration symmetry), is taken as the basic LC molecular director configuration in the LCD cell of the LCD light-switching element. However, unlike in the case of the standard 180° STN LCD, where the polarizers are oriented at 45° with respect to the alignment of the LC molecules on the boundary surfaces $1c^a$, $1c^b$ of the LCD cell, the crossed polarizers P, A are according to the invention oriented so that the light input polarizer P is oriented to select only one light propagation mode. Due to its symmetry preferably ordinary light ray propagation mode is selected by orienting the input polarizer perpendicularly to the LC molecular alignment at the input boundary alignment layer $1c^a$—(Pi twisted ordinary light ray propagation mode—POM). In order that such a display configuration would transmit the maximum amount of light in the "optically open" state, and allow for the maximum light attenuation in the electrically driven—"optically closed" state (maximum contrast), the LC cell parameters (birefringence Δn, cell thickness d, wavelength λ of the propagating light) should fulfill a very similar relation:

$$(\Delta n \times d)/\lambda \sim 1,$$

as in the case of the standard first minimum TN (90°) LCD $((\Delta n \times d)/\lambda \sim 0.87)$. This means that the light coming to the output polarizer (analyzer) A is almost circularly rather then linearly polarized, as in the case of the standard first minimum TN LCD. Therefore the light transmission in the open state is ~½ of the light transmission of the standard TN LCD.

Such a combination of the LC director configuration in the LCD cell and relative crossed polarizer P, A orientation (POM cell) is not used in practice with standard STN LCDs, as the specific STN LCD cell properties, allowing for highly multiplexed electric driving, could not be achieved, to a full extent. In the case of the "Pi-cell" solutions a single mode cannot be realized at all, as such an LCD light-switching element would not be able to transmit the light in the electrically non-driven (optically open) state. It is true that some light transmission in the optically open state is lost as a result of such a configuration, however the resulting excellent angular dependence in the electrically driven (optically closed) state makes such a solution a very acceptable tradeoff for the LCD light shutter applications.

The proposed technical solution has some important advantages over the prior art solutions:

1. The LC molecular orientation is stable and does not need any electric driving in the open state in order to stabilize the LC orientation, as for example the "Pi-cell" does,
2. The choice of the single, preferably ordinary light propagation mode strongly reduces the residual birefringence (resulting mainly from the layer 2 of the LC layer 4) and hence very high contrasts can be achieved with moderate driving voltages without any additional positive birefringent a-plate compensation layers and driving voltage adjustments, as would be necessary in the case of the STN or a "Pi-cell" solutions in order to achieve the same results,
3. With the addition of only a simple, cheap c-plate negative birefringent layer R (see FIG. 4) between the LCD cell and the crossed polarizers, which compensates for the angular dependence of the homeotropically aligned central layer 3 (FIG. 2), excellent angular dependence of the light attenuation (see FIG. 5b), can be achieved. The main reason for this excellent performance is the fact that the LC director configuration in the boundary LC layers 2a, 2b (FIG. 2) is highly symmetric and exhibits to a very high extent the self-compensating properties, as schematically presented in the FIG. 3 for the specific case of the "Pi-cell".
4. The production technical requirements are significantly less demanding than with the STN or "Pi-cell" solutions—lower production costs.

DESCRIPTION OF DRAWINGS

This invention may be better understood and its objectives and advantages will become apparent to those skilled in the art by reference to the annexed drawings as follows:

FIG. 3—Schematic sectional view of the LC director configuration between the boundary alignment layers in the electrically driven ($V > V_{th}$) homogeneously aligned LCD cell (a) and the "Pi-cell" (b), showing the basic concept of the "self-compensating" LC configuration FIG. 4—Schematic presentation of the negative c-plate angularly compensated POM LCD light-switching element FIG. 5—Angular dependence of the light attenuation plot:
  a) Uncompensated LCD light-switching element
  b) Negative-birefringent "c-plate" compensated LCD light-switching element FIG. 6—Dependence of the POM cell light transmission in the "optically open" state on the LC cell parameters FIG. 7—Schematic presentation of the deformed POM LCD cell (twist angle 200°):
  a) Cross-sectional view of the electrically non-driven (V=0) LCD cell
  b) Schematic presentation of the top and bottom LC alignment
  c) Top view of the effective residual birefringence, corresponding to the different layers of LC in the electrically driven state ($V \geq 2V_{th}$)
  d) Top view of the effective "residual birefringence" in the deformed POM LCD cell (200° twist).

DETAILED DESCRIPTION OF THE INVENTION

Figure 1:
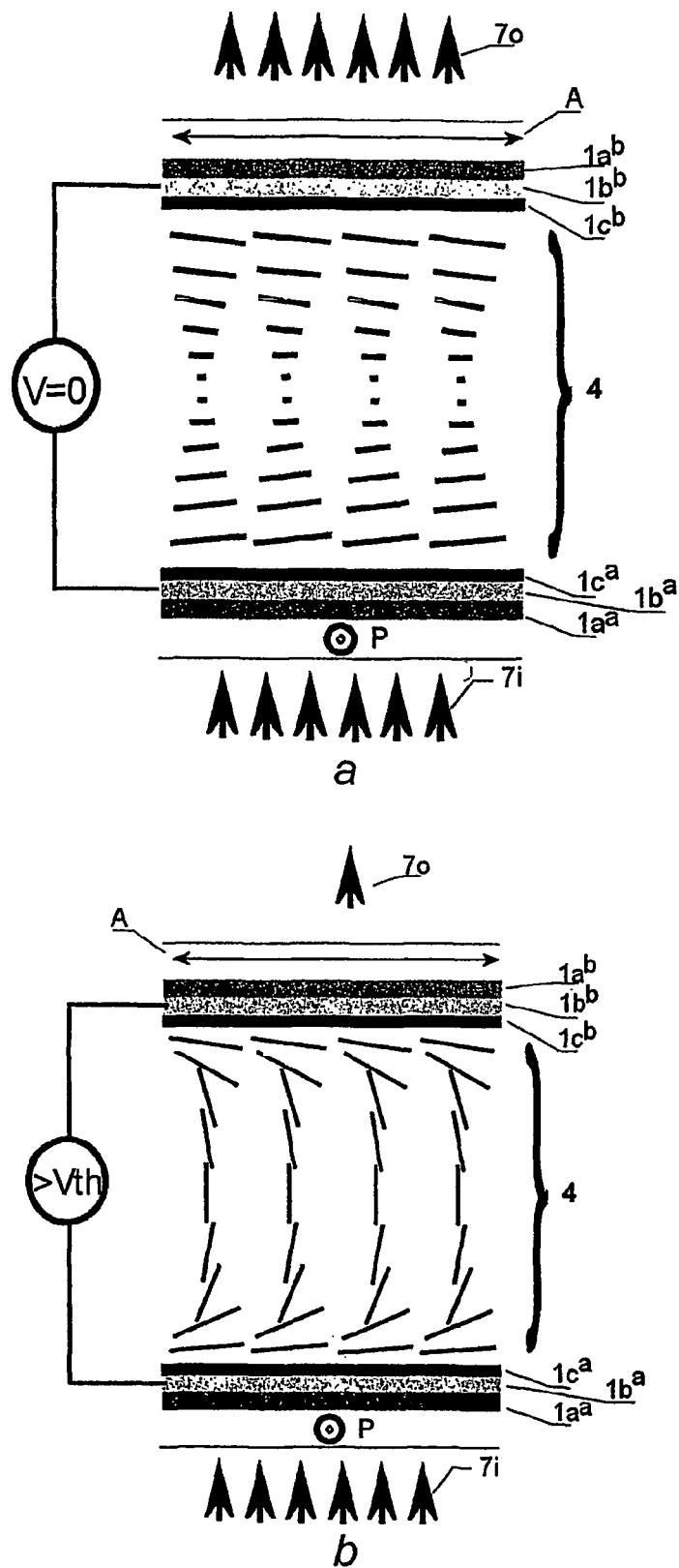
FIG. 1—Schematic presentation of the 180° twisted (Pi) LCD cell using "ordinary light ray" propagating mode (POM cell):
  a) Electrically non-driven optically open state
  b) Electrically driven optically closed state FIG. 2—Schematic presentation of the effective "residual birefringence" in the 180° twisted (Pi) LCD cell using ordinary light ray propagating mode (POM cell):
  a) Cross-sectional view of the LCD light shutter
  b) Birefringent ellipsoids of each of the LC layers 2, 3
  c) Effective birefringent ellipsoid of the LC layers 2, 3

The LCD light-switching element, using 180° twisted (Pi) LC director configuration and single, preferably ordinary light ray propagating mode (POM cell) according to the invention, is described in detail using FIGS. 1-7:

The 180° twisted LCD cell, as schematically presented in the FIG. 1, is made in a standard way using transparent ITO electrodes $1b^a$, $1b^b$ on the front and back boundary glass substrates $1a^a$, $1a^b$, as shown in the FIG. 1. In order to establish a uniform 180° alignment of the LC molecules LC, the boundary glass substrates $1a^a$, $1a^b$ with ITO electrodes $1b^a$, $1b^b$ are uniformly covered with thin, few tens of nm thick layer of polymer $1c^a$, $1c^b$, preferably polyimide, buffed in the same direction on both the front $1a^a$ and back $1a^b$ substrate to insure the alignment surface induced LC molecular alignment to have similar self-compensating effect as the Pi-cell (see FIG. 3). In order to avoid any "reverse twist" defects, the liquid crystal LC is doped with adequate amount (few %) of chiral additive. The LCD cell spacing d and the value of the birefringence $\Delta n$ of the liquid crystal 4 are correlated so that they fulfill the relation $(\Delta n \times d)/\lambda \sim 1$, (similar to the first minimum 90° TN LCD). This means that the light 7i, incident on the input polarizer P, will be almost circularly polarized after passing the LC layer LC and the output polarizer A (analyzer), oriented at 90° to the direction of the input polarizer P, will transmit the light 7o having ~50% of the intensity that would be transmitted in the case of the regular 90° TN LCD (FIG. 1a). If an electric driving field (V/d), induced by the electric voltage V across the LCD cell with the electrode spacing d, exceeding several times the value of the voltage threshold $V_{th}$ for the "Frederic's transition" to occur, the homeotropic alignment of LC molecules is created in the LCD cell and the output polarizer/analyzer A will not transmit the light (FIG. 1b).

The light extinction of LCD light-switching element in the optically closed state in the case of the homeotropically aligned LC cell, as described above and schematically shown in the FIGS. 1 and 2, is generally not complete especially, if observed at an oblique angle of light incidence. As mentioned from the very beginning, the reasons are as follows:

1. Effective positive birefringence of the homeotropically aligned LC molecules in the central part 3 of the LC layer 4 of the LCD light-switching element, when observed at an oblique angle—As will be described in more detail later, one can very efficiently compensate for this effect by using the negative birefringent compensation layers.
2. Overall effective birefringence of thin "surface layers" 2a, 2b of the LC molecules 4 at both LC-cell boundary surfaces $1c^a$, $1c^b$, mainly controlled by the alignment surface interactions—This effect is a lot smaller, however it significantly contributes to the asymmetry of the angular dependence of the light attenuation. In the present state-of-the-art solutions the residual birefringence of the "surface layers" 2a, 2b of the LC molecules is compensated with an additional small value positive-birefringent (typically several ten nm) layer. According to the invention the problem of the said residual birefringence is considerably reduced by choosing the "ordinary light propagation mode" by orienting the input polarizer P to be perpendicular to the LC molecular alignment direction.

3. The asymmetry of the effective birefringence of the LC molecular alignment in the transition regions 2a, 2b between the homeotropically aligned LC in the central part 3 of the LC layer 4 and the LC-cell boundary surfaces $1c^a$, $1c^b$—The effect is typically smaller than the other two, however it cannot be ignored especially in "low" electric voltage driving regime of the LCD light-switching element (dark scale)—to be reported at SID 2003 by Pirs et al. According to the invention the asymmetry of the angular dependence of the light attenuation due to the effective birefringence of the said transition LC layers 2a, 2b (FIG. 2) can be considerably reduced by making the LC alignment as angularly symmetrical as possible (for example—180 degree twist)

4. Angular dependence of the crossed polarizers (→effective 90° angle changes with the viewing angle).

The relative contributions to the overall angular dependence of the light attenuation of the LCD light-switching element in the optically closed state vary from case to case, however in most situations the positive birefringence of the homeotropically aligned part of the LC layer 3 (contribution #1) and the angular dependence of the crossed polarizers P, A (contribution #4) are dominant. However the overall residual birefringence and its symmetry of the surface layers of liquid crystal 2a, 2b (contribution #2, #3) cannot be ignored completely in order to achieve the state-of-the-art results (see FIG. 4).

In order to be able to achieve high contrast and high switching speeds—typical situation found with the LCD light filters for eye protection applications (for example welding light filters, light switchers for stereovision, . . . ), high driving voltages are required. In this special case the alignment of the LC molecules in the optically closed state is highly homeotropic and the objectives of the invention, as specified before, can be realized with the use of one simple negative-birefringent compensating plate, provided that the LC alignment is symmetric enough around the normal to the LC cell and has self-compensating properties, as shown on the FIG. 3.

As it has been mentioned before, the light attenuation dependence of the LCD light-switching element due to the effective positive birefringence of the homeotropically oriented LC molecules 3, if observed at an oblique angle (contribution #1), can be completely compensated by the addition of the negative-birefringent plate R (see FIGS. 4 and 5) having the negative birefringence value $\Delta n_{retarder}$ and the optic axis oriented perpendicularly to the LCD boundary surfaces $1c^a$, $1c^b$ (the same direction as the positive-birefringence of the homeotropically aligned LC media 3). If the thickness $d_{retarder}$ of the negative-birefringent compensatory layer R is adjusted to comply with the requirement: $\Delta n_{retarder} \times d_{retarder} = \Delta n_{LC\ homeotropic} \times d_{LC\ homeotropic}$, a complete angular compensation could be achieved. The thickness $d_{retarder}$ of the negative-birefringent compensatory layer R can also be adjusted to not exactly comply with the above requirement, for example to further compensate external influences. A typical value of the deviation from the exact value is +/−20%.

Figure 4:
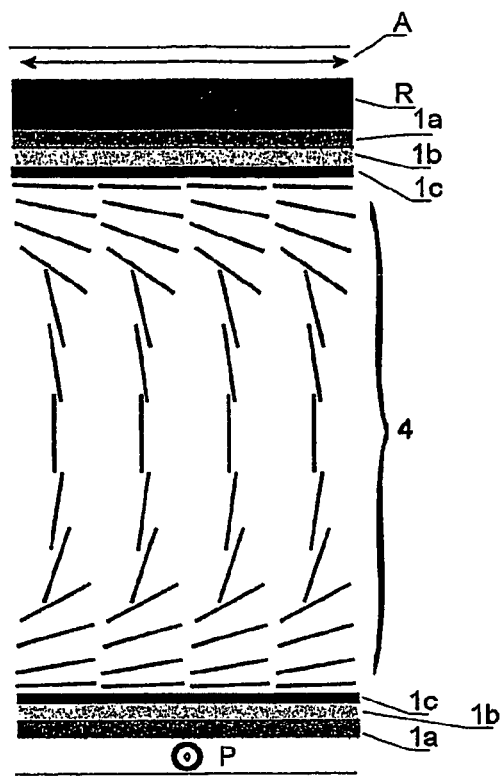
Figure 5:
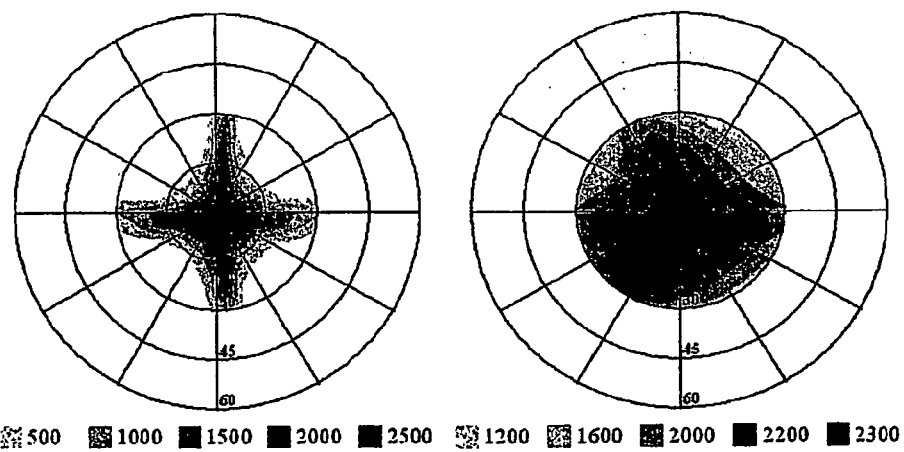
Figure 6:
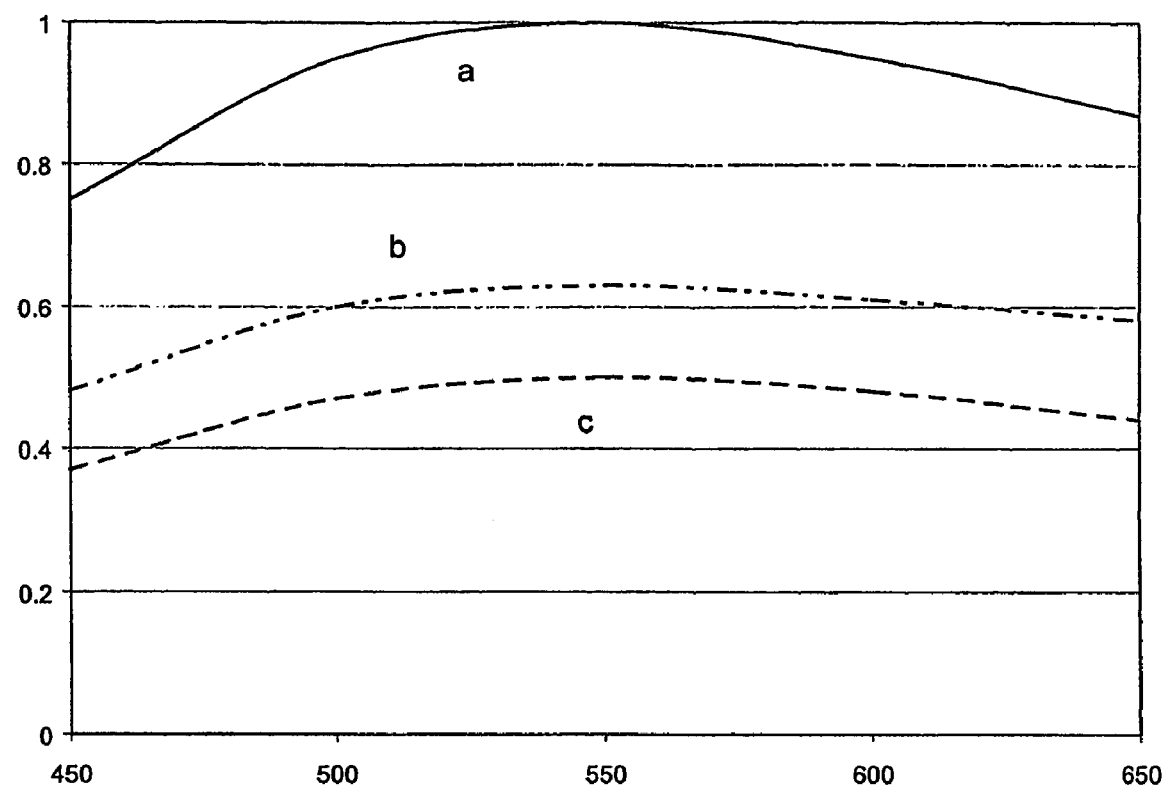

Furthermore, by correctly positioning the negative-birefringent retardation plate R (→between LCD cell boundary glass with LC alignment layer direction parallel to the adjacent polarizer and the said polarizer—see FIG. 4) one can very efficiently simulate the known "two additional birefringent layer concept" for reducing the angular dependence of the crossed polarizers. With the difference from the prior art solution (-two additional birefringent layers!!) using the technical solution according to the invention, a very similar result can be achieved without introducing any additional birefringent layers. The fact is that the highly twisted (180°) STN LCD cell, as proposed in this patent application, exhibits reasonably large residual positive "a-plate" retardation in the optically closed state. The said residual retardation can therefore play the role of the additional positive "a-plate", as required by a prior art solution. Instead of selecting the negative-birefringence c-plate layer R, to completely compensate for the positive-birefringent homeotropically aligned part 3 of the LC layer 4 (FIG. 4), one can make it adequately less birefringent. The effective overall residual positive c-plate birefringence, resulting from homeotropically aligned LC molecules 3, negative birefringence of the polarizing films P, A and negative-birefringent layer R, can perform the role of the second positive-birefringent c-plate layer, required for compensating for the angular dependence of the crossed polarizers P, A (contribution #4). The obtained results are very convincing—see FIG. 5b, which shows hardly any signs of the "polarization cross" typical for angular dependence of the polarizers.

The negative-birefringent plate R however cannot compensate for the effective birefringence (see FIG. 2) of thin "surface layers" of the LC molecules 2a, 2b at both boundary surfaces $1c^a$, $1c^b$ (contributions #2, #3). The optical properties of the said "transition" LC layers 2a and 2b are in principle rather complicated due to their twisted structure. As the optical birefringence of the homeotropically aligned LC molecules RB3 still represents the major influence on the optical properties of the LCD cell and since the "transition" LC layers 2a and 2b are rather thin, one can approximate their optical effects by effective "residual birefringences" RB2a, RB2b, as shown in the FIG. 2b, which can finally sum up into an "effective birefringent ellipsoid" RB (FIG. 2c). In the ideal case of 180° twisted LC molecular director configuration the principal axis of this "effective birefringent ellipsoid" RB coincides with the molecular alignment on the boundary surfaces $1c^a$, $1c^b$ (FIG. 2). According to the invention the unwanted optical effects of this "residual birefringence" are considerably reduced by making the LC alignment as angularly symmetric as possible (for example—180 degree twist) and by orienting the input polarizer P so that only single, preferably isotropic "ordinary mode of light propagation" is selected. In view of this, making the orientation of the input polarizer P to be perpendicular to the LC molecular alignment on the boundary surfaces $1c^a$, $1c^b$, results in selecting the ordinary mode of light propagation through the LC media In order to achieve maximum light attenuation, the output polarizer/analyzer A has to be oriented perpendicularly to the input polarizer P and hence parallel to the LC molecular alignment.

As a result of the above described optical compensations (#1, #2) as well as "symmetrizations" (#3) and corrections for the crossed polarizers by proper placement of the negative-birefringent compensating layer R (#4), an angularly highly independent light attenuation of the LCD light-switching element according to the invention can be obtained. The results are shown in the FIG. 5b, which shows the angular dependence of the light attenuation (bottom scale) in the optically closed state for a highly homeotropically aligned POM LCD light shutter in a fully saturated regime ($V_{driving} = 5\ V_{th}$) compensated with adequate negative-birefringent compensation layer R placed between the LCD cell and the crossed polarizers, as described before. Comparison with the angular dependence plot for the uncompensated LCD light shutter (FIG. 5a) is very convincing.

Concept Generalization (Beyond 180° Twist):

At this point it has to be emphasized that the above-described concept of reducing the unwanted optical effects of the "residual birefringence" of the "surface" LC layers 2a and 2b (FIG. 2) by orienting the light input polarizer P to select one, preferably the shorter, principal axis of the "effective birefringent ellipsoid" RB as the input light propagation mode, has a much broader application than just with the above described 180° twisted LC molecular director configuration. The fact is that the angular dependence of the light attenuation of the LCD light-switching elements, using highly-twisted LC structures with twist angles either somewhat bigger or smaller than 180° (FIGS. 7a, 7b), is not much worse than with the ideal case of 180°, provided that the input polarizer P is aligned along one, preferably shorter (→"effective ordinary light ray"), of the principal axes of the "average effective birefringent ellipsoid RB" (FIGS. 7c, 7d). In order to achieve maximum light attenuation, the output polarizer/analyzer A has to be oriented perpendicularly to the input polarizer P.

Generalizing the concept of improving the angular dependence of the light attenuation of the LCD light-switching elements beyond the use of only the most symmetric 180° twisted LC molecular director configuration and the single, preferably ordinary, light ray propagation mode makes a lot of sense. The fact is that the angular compensation of the light attenuation according to the proposed invention is extremely efficient, however at the expense of somewhat reduced light transmission in the optically open state of the LCD light-switching element. The reduction of the light transmittance in the open state results from the fact that it depends on the twist angle of the LCD molecular director structure and the crossed polarizer orientation relative to the LC molecular alignment. The "180° configuration" with the crossed polarizers oriented to select only the single mode of light propagation has the lowest transmittance (see FIG. 6). Ea many cases the technical requirements for the device using the LCD light-switching elements according to the invention are met, even if the LCD structures with twist angles 10 to 20 degrees off the ideal 180° value are used, provided that the input polarizer P is oriented perpendicularly to the "average long principal axis" (effective ordinary ray) between the long principal axes of the front (RB2b) and the back (RB2a) "effective birefringent ellipsoids" (FIGS. 7b, 7c). Preferably the twist angle is within the range of 180°+/−10°.

A typical example of the advantage of the "generalized concept" represent LCD protective welding light filters and the International safety regulation EN 379 for personal protective glasses:

The POM LCD light shutters provide for a far better angular compensation than required by the new, most demanding International safety regulation EN 379. However their light transmission in the optically open state is not so good and degrades the overall optical properties. Being able to use the LC molecular director configuration twist angles different from 180° one can noticeably increase the light transmittance in the open state of the LCD light-switching element. The possible tradeoff between optimized angular compensation of the light attenuation in the optically closed state and the light transmittance in the optically open state of the LCD light-switching element is evident from FIG. 6. This figure shows the spectral dependencies of the light transmittance in the open state of the LCD light-switching elements having different twisted structures normalized to the maximum light transmittance of the standard "first minimum" 90° TN LCD (trace a). As the trace c corresponds to 180° and the trace b to 210° LC molecular director configuration, it is obvious that tradeoffs can be sometimes very efficient.

The following Example is a working embodiment, describing the use of the proposed concept for manufacturing LCD light-switching elements allowing for high, electrically controlled and angularly independent light attenuation.

EXAMPLE

LCD Light Shutter for Eye Protection in Welding Applications

The use of the proposed technical solutions can be best demonstrated by their application in personal protective devices like the automatic LCD welding light filters.

Figure 8:
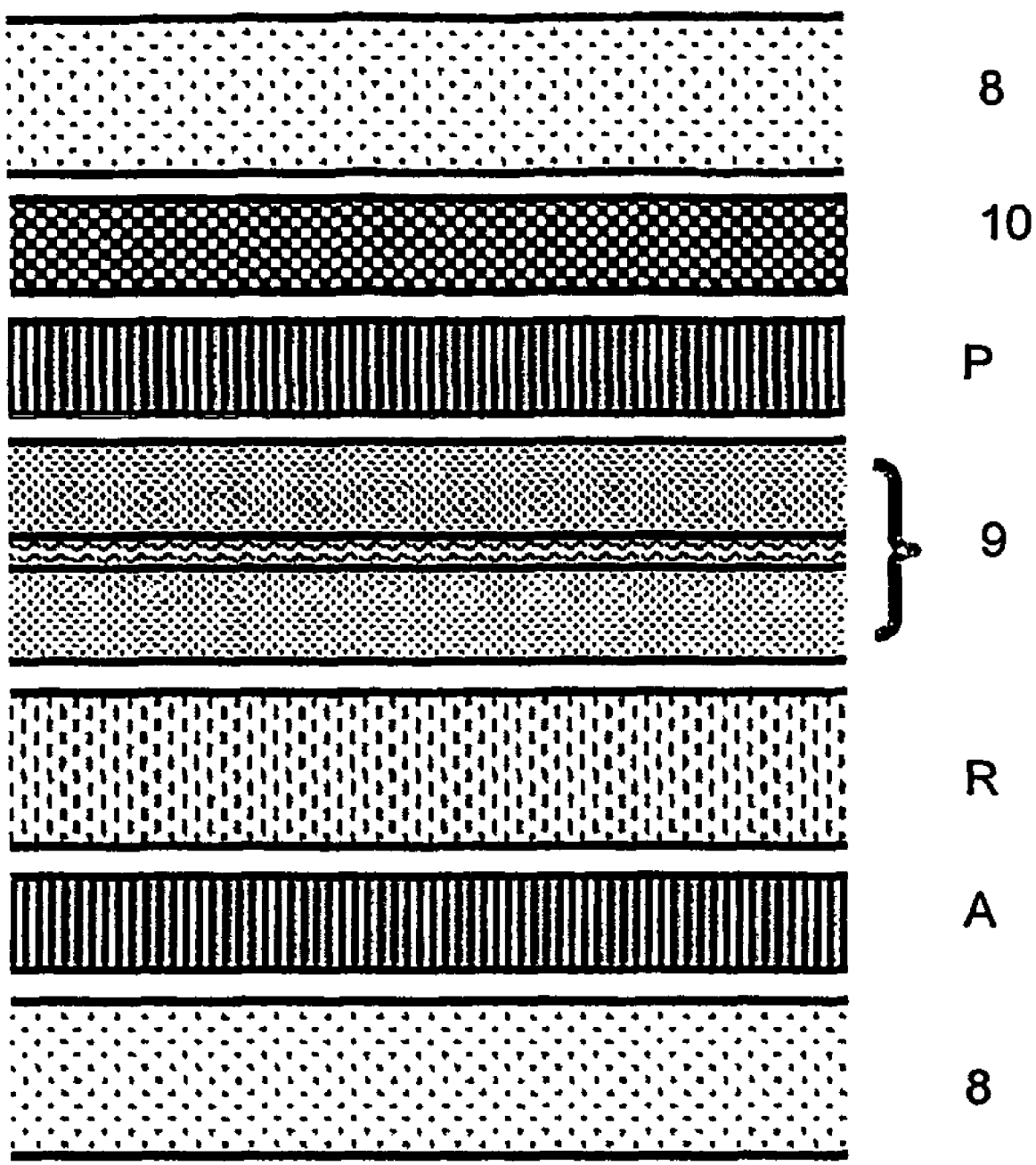
FIG. 8—Block diagram of the LCD protective welding light filter

In order to comply with internationally accepted personal protection requirements, as specified in EN 379 and the like norms, a typical LCD welding light filter has to be made as a multilayer laminate (FIG. 8), comprising the inner and outer protective glass 8, electrically controlled optical birefringent element—LC-cell 9, polarizers P/A, birefringent compensation layer R and UV/IR filter 10, which selectively reflects the harmful IR and UV light.

In order to comply with overall technical requirements (high light attenuation, high switching speed, . . . ) typically very high driving voltages for the LCD light switching elements are used. Because of high driving voltages, which can exceed 15 V, these LCD light switching elements typically operate in highly saturated regime. This is in particularly true in the case of low priced LCD welding filters with fixed light attenuation, which employ just one light switching LCD cell. Their construction and operation is presented with the reference to the FIGS. 1, 2, 4, 5, 7 and 8. As the light attenuation can have a fixed value, a high driving voltage (-fully saturated regime) can be used, resulting in highly homeotropic alignment and high light attenuation, which is determined only by the crossed polarizers.

As mentioned before, in such a situation the positive birefringence of the homeotropically aligned LC molecules in the optically closed state represents far the major reason for the degradation of the angular dependence of the light attenuation. The device performance can be importantly improved by adding a negative-birefringent plate R, as schematically presented in the FIG. 4 between the LCD cell and either one of the crossed polarizers P, A, preferably, for the reasons described before, between the LCD cell and the polarizer aligned in parallel with the LC alignment direction.

As pointed out before the POM LCD light shutters provide for a far better angular compensation than required by the safety regulation EN 379, however their light transmission in the optically open state is not so good and degrades the overall optical properties. The best compromise should be sought after in twist angles different from 180°, which offer a better compromise between the angular dependence, as required by the international quality and safety regulations like EN 379, and the light transmission in the optically open state. The best choice for the LC twist angles in the case of the LCD welding light filters seems to be ~160° or ~200°.

Figure 7:
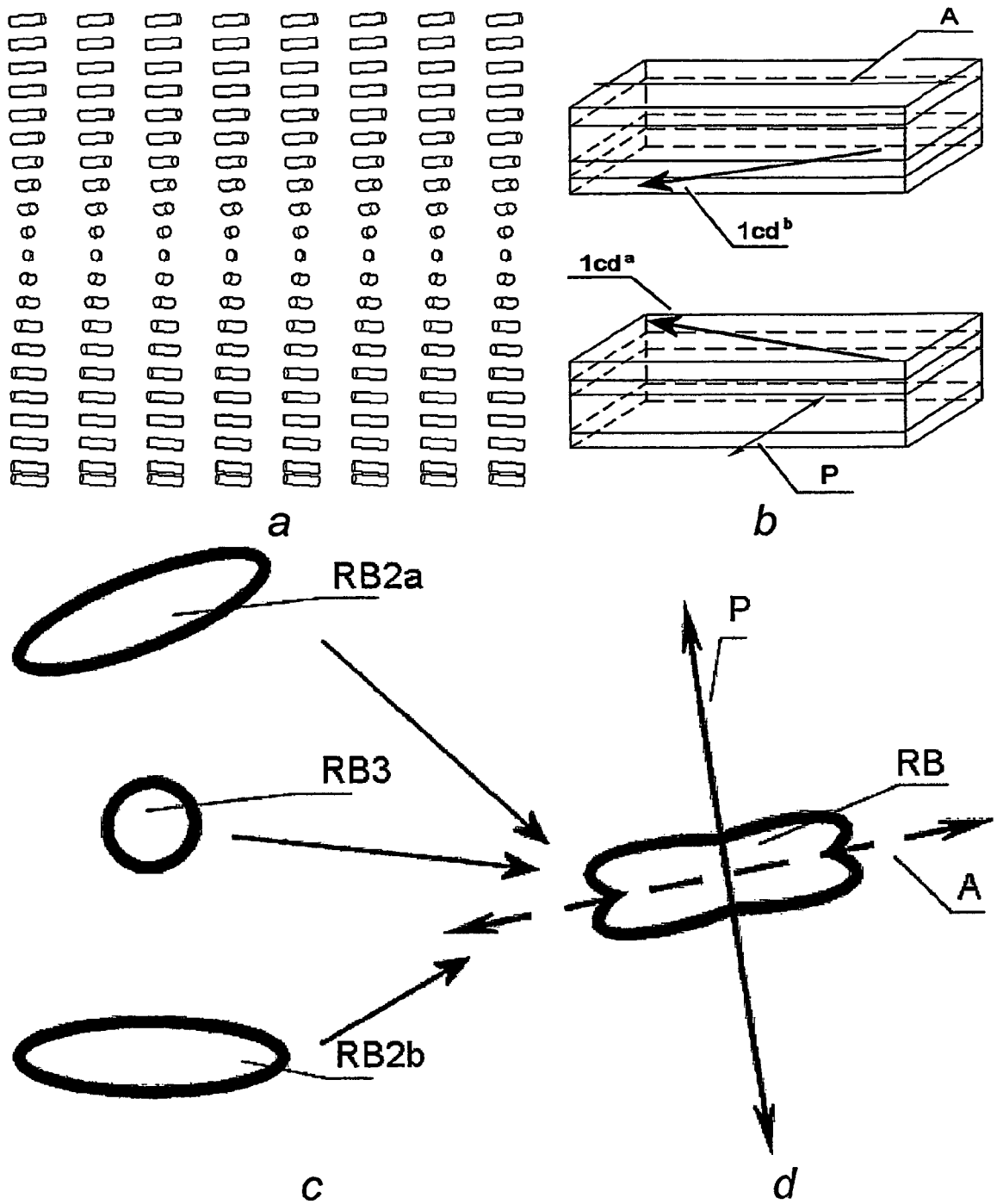

The electrooptically active part of the "fixed shade" LCD welding light filter—the LC cell—is therefore made according to the standard STN LCD production process, as shown schematically in the FIGS. 1 and 7, using soda—lime glass as the LC-cell boundary plates $1a^a$, $1a^b$. In order to generate the driving electric field across the LC layer LC the boundary glass plates $1a^a$, $1a^b$ have to be covered with the transparent ITO electrodes $1b^a$, $1b^b$, preferably exhibiting a surface resistance typically 50 Ohm/square. The said electrodes are further covered with typically 50 nm thick, low residual DC voltage (RDC) polyimide like SE 4792. The top and the bottom polyimide alignment layers $1c^a$, $1c^b$ are then rubbed in a standard way to induce the required alignment and sealed together with a perimeter seal using 4-5 μm spacers to form the LC cell. The latter is further filled in vacuum with LC, preferably low ionic content super-fluorinated LC like MLC- 9700-100. In order to stabilize the 200° STN molecular orientation (FIG. 7a) the said LC is doped with ~0.2 to ~1% of the chiral dopant like S811. The fill hole is further sealed with UV curable sealant like NOA 61. Finally a high contrast polarizer P like LLC2-5618 is laminated on the light input side of the LC cell so that its light-transmitting axis is perpendicular to the optical axis of the effective ellipsoid RB, which is parallel to the symmetry axis between the alignment directions $1cd^a$, $1cd^b$ (FIG. 7b) on the front $1a^a$ and rear $1a^b$ boundary glass.

The light output side of the LC-cell is laminated to the negative birefringent plate R having optical axis perpendicular to the LC-cell plane. The absolute value of the negative birefringence of the said layer R is selected to be somewhat (adequately) smaller than the difference between the absolute value of the positive birefringence of the homeotropically aligned part of the LC layer 3, as shown in the FIG. 2, and the absolute value of the negative birefringence of the polarizing films. The reason for this apparent "birefringence mismatch" is that with such a construction one can introduce the concept for compensating the angular dependence of the crossed polarizers using additional positive-birefringent a-plate and positive-birefringent c-plate retardation layers. In the case, as described above, the residual retardation of the surface LC layers plays the role of the said positive a-plate, while the effective overall residual positive c-plate birefringence (resulting from homeotropically aligned LC molecules 3, negative birefringence of the polarizing films P/A and negative-birefringent layer R) performs the role of the said second positive-birefringent c-plate layer—a simple, not fully optimized but rather efficient implementation of the said concept, realized without any additional parts!

Finally the polarizer A is laminated on the retardation layer R so that its light-transmitting axis is perpendicular to the input polarizer P and parallel to the average LC molecular alignment direction. The polarizing efficiency of both polarizers A, P is selected so that the required light attenuation is achieved (for example: SHC 125-U for the shade 10 according to EN 379 regulation). The above described filter assembly is finally laminated between two glass plates 8 for scratch and corrosion protection. If the above adjustments, alignments and optical birefringence compensations are done, as described above, the obtained fixed shade welding light filters significantly outperform even the most demanding requirements of the Intl. safety and quality standards for the personal protection devices such as EU norm EN 379.

It should be however emphasized, that the described example represents only one feasible working embodiment of the angular compensated LCD welding filter according to the invention. Various modifications and variations can be made Within the scope of this invention, especially in the choice of extraordinary rather than the above described ordinary ray light propagation mode and related constructional changes (rotation of the polarizers, placement of the retarder R, . . . )

The invention claimed is:

1. High contrast, wide viewing angle LCD light switching element, in particular light shutter, comprising
    two crossed polarizers (P, A), an electrically controlled optical birefringent LC cell including a layer of highly twisted liquid crystal (4) enclosed between two boundary glass plates ($1a^a$, $1a^b$), said plates ($1a^a$, $1a^b$) being on an inner side covered by transparent electrodes ($1b^a$, $1b^b$) and alignment layers ($1c^a$, $1c^b$), and a negative-birefringent compensating layer (R) built-in between the boundary glass plates ($1a^a$, $1a^b$) and either one of the crossed polarizers (P, A), characterized in that
    the layer of highly twisted liquid crystal (4) is formed with a twist angle of at least nearly 180° and that
    the crossed polarizers are oriented with respect to a liquid crystal (4) surface alignment direction determined by the alignment layers ($1c^a$, $1c^b$) so that only a single mode of light propagation is selected and that
    the optical axis of the negative-birefringent layer (R) is oriented parallel to the normal to the LC cell boundary glass plates ($1a^a$, $1a^b$), an absolute value of the birefringence of said layer (R) being at least nearly equal to a difference between an absolute value of a positive-bireflingence of a homeotropically aligned part (3) of the layer of highly twisted liquid crystal (4) formed in an optically closed state of the LC cell and an absolute value of a negative-birefringence of the crossed polarizers (P, A) in order to compensate for an angular dependence of the homeotropically aligned part (3) in the LC cell,
    wherein the optically closed state is achieved by driving the LC cell with a driving voltage exceeding 2× a switching threshold voltage $V_{th}$ of the LC cell, preferably with a driving voltage of at least $5 \times V_{th}$.

2. High contrast, wide viewing angle LCD light switching element according to claim 1, characterized in that
    the twist angle of the layer of highly twisted liquid crystal (4) is 180°+/−20° and that
    the crossed polarizers (P, A) are oriented with respect to the liquid crystal (4) surface alignment directions ($1cd^a$, $1cd^b$) on the boundary glass plates ($1a^a$, $1a^b$) to be parallel respectfully perpendicular to the long axis of an "average birefringent ellipsoid" (RB) representing the overall residual average birefringence of LC surface layers (2a, 2b) of the layer of highly twisted liquid crystal (4).

3. High contrast, wide viewing angle LCD light switching element according to claim 1, characterized in that
    the negative-birefringent layer (R) is built-in between the boundary glass plate (1a or 1b) and the adjacent polarizer (A or P), whichever is parallel with the liquid crystal (4) surface alignment direction on the boundary glass plate (1a or 1b).

4. High contrast, wide viewing angle LCD light switching element according to claim 2 characterized in that
    the negative-birefringent layer (R) is built-in between the boundary glass plate (1a or 1b) and the adjacent polarizer (A or P), whichever is parallel with the long principal axis of the effective birefringent ellipsoid (RB) of the liquid crystal (4).

5. High contrast, wide viewing angle LCD light switching element according to claim 3 or 4, characterized in that
    the negative-birefringence of the compensation layer (R) is tuned to compensate for the positive-birefringence of the homeotropically aligned part (3) of the layer of highly twisted liquid crystal (4) as well as for a dependence of an effective angle between the crossed polarizers (P, A) on a light incidence angle.

6. High contrast, wide viewing angle LCD light switching element according to claim 1 or 3 characterized in that the crossed polarizers are oriented with respect to the liquid crystal (4) surface alignment direction so that only an ordinary light ray is selected.

7. The use of a high contrast, wide viewing angle LCD light switching element according to claim 1 as at least one of pixel elements in a wide viewing angle multi-pixel LCD panel.

8. The use of a high contrast, wide viewing angle LCD light switching element according to claim 1 as an optical light shutter, in particular in a welding filter.

* * * * *